May 22, 1962 D. M. HATCH 3,035,630
MACHINE FOR MOLDING PLASTIC ARTICLES
Filed Dec. 29, 1958 2 Sheets-Sheet 1

INVENTOR.
DONALD M. HATCH
BY
Clifford L. Sadler
ATTORNEY

May 22, 1962 D. M. HATCH 3,035,630
MACHINE FOR MOLDING PLASTIC ARTICLES
Filed Dec. 29, 1958 2 Sheets-Sheet 2

INVENTOR.
DONALD M. HATCH
BY
Clifford L. Sadler
ATTORNEY

United States Patent Office 3,035,630
Patented May 22, 1962

3,035,630
MACHINE FOR MOLDING PLASTIC ARTICLES
Donald M. Hatch, Rochester, Mich., assignor to Curtiss-Wright Corporation, Utica Division, Utica, Mich., a corporation of Delaware
Filed Dec. 29, 1958, Ser. No. 783,374
3 Claims. (Cl. 156—498)

The present invention relates to a method and machine for molding plastic articles, and more particularly to a method and apparatus employed in molding plastic articles containing multiple layers of reinforcing material.

Prior to the present invention it has been necessary in the molding of reinforced plastic articles to position each layer of reinforcing material by hand. Where the reinforcing materials are of different sizes and it is extremely important to maintain their relative lateral position, such hand lay-up becomes tedious and subject to human error in handling.

In view of the foregoing state of the art, it is therefore an object of the present invention to provide a method and machine adapted to pre-position multiple layers of reinforcing material relative to each other prior to insertion in the mold for the forming of the final plastic article.

It is further an object of this invention to perform the aforementioned pre-position by providing a machine for continuously tacking layers of reinforcing material together.

These and further objects of the present invention will become amply apparent from the following description and the accompanying drawings in which.

Figure 1:
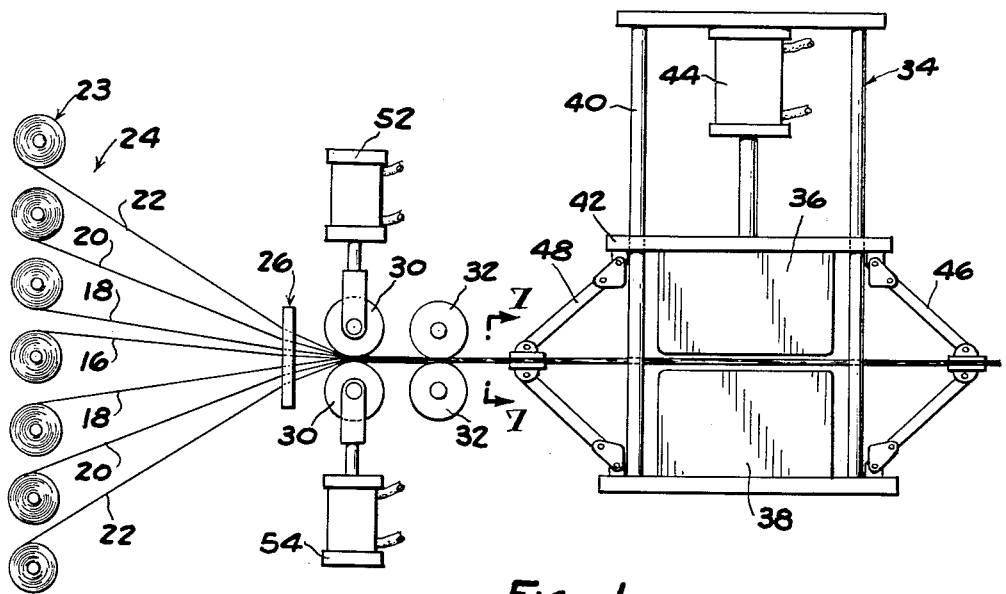
FIGURE 1 is a schematic drawing of a molding machine constructed according to the present invention.
Figure 2:
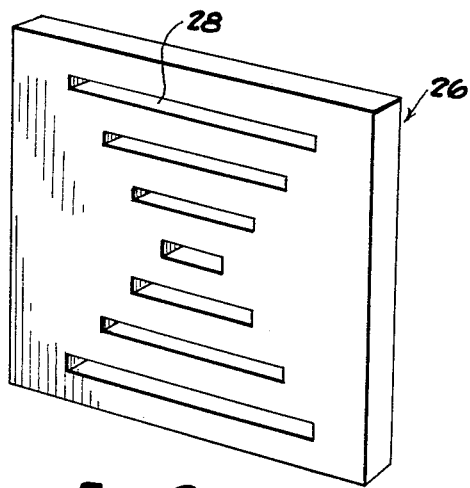
FIGURE 2 is a perspective view of the positioning comb employed in the machine of FIGURE 1.
Figure 4:
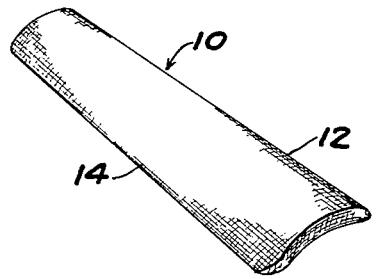
FIGURE 4 is a perspective view of the article shown in FIGURE 3 after trimming of the flash and ready for use.

Referring now to the drawings for a more detailed description wherein like reference numerals define like parts, FIGURE 1 discloses a schematic representation of a machine embodying the present invention. This machine is adaptable to the formation of a variety of reinforced plastic articles but is herein described in connection with the formation of a reinforced plastic compressor blade such as used in the compressor section of a gas turbine engine. An example of a finished form of such a blade 10 is shown in FIGURE 4. By way of illustration, blade 10 is formed from a plurality of glass cloth reinforcing material layers or laminations bonded together by phenolic resins.

Figure 7:
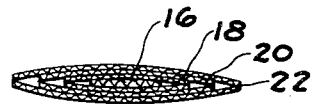
FIGURE 7 is a sectional view taken along section line 7—7 of FIGURE 1.

FIGURE 4 discloses an airfoil compressor blade 10 having a profile shape determined by aerodynamic considerations. The profile shape of necessity is thickest near the middle thereof and has tapering leading and trailing edges 12 and 14. In order to form a blade having greater bulk in its central region and tapering leading and trailing edges, it is necessary to first start with multiple laminations of reinforcing material such as shown in FIGURE 7 wherein the widths of the layers of material vary to provide the mass distribution required. FIGURE 7 discloses, by way of example, a lay-up of seven (7) layers of reinforcing fabric having a narrow central piece 16, intermediate width pieces 18 and 20, and exterior layers 22 of greatest width. FIGURE 7 is merely illustrative, the number of laminations and widths depending upon the physical dimensions of the blade or other article which is to be formed.

In order to form a perfect blade 10, it is necessary to pre-position the layers of reinforcing material such as shown in FIGURE 7 and to maintain that relative position in the mold. The present invention achieves that desirable result.

Referring now to FIGURE 1, a plurality of rolls 23 of reinforcing cloth 24 are positioned to feed reinforcing material. Because the article under consideration is a plastic blade, these bolts of cloth are relatively narrow and are more aptly described as tapes. The numeral 24 identifies collectively the series of tapes or pieces 16, 18, 20, and 22.

In the preferred form of the invention the tapes 24 are woven glass fiber cloth pre-impregnated with phenolic resin which is hardenable by polymerization under heat and pressure.

While phenolic resins are thermosetting materials, since they cannot again be softened after being polymerized to a hardened state, they are softenable or meltable by the application of pre-polymerization temperatures. Particularly if the pre-polymerization heat is removed and the resin impregnated material chilled, the material may, at least temporarily, exist in a tacky or adhesive state. It is, of course, to be understood that once the polymerization process has been begun, as occurs when the resin is melted, it will continue with the rate of polymerization being variable by the application of heat and pressure. Thus, "pre-polymerization temperatures" is a relative expression and actually means temperatures which will soften the resin and polymerization will be taking place but very slowly. It is conceivable that glass fiber rovings might be substituted for some or all of the woven cloth tape.

The series of tapes 24 are drawn off the rolls 23 and passed through a positioning device or comb 26. The comb 26 comprises a stationary plate having a series of lateral slots 28 formed therein through which the tapes 24 pass. Each of the individual tapes 16, 18, 20, and 22 passes through a separate slot. The slots 28 are vertically spaced apart but are laterally positioned to have the same relative arrangement that is desired of the lay-up prior to entering the mold. After passing through the comb 26 and being positioned thereby, the tapes 24 pass between heated rollers 30. The rollers 30 are heated to a temperature sufficient to soften or melt the resin pre-impregnated into the reinforcing material. For phenolic resins this will be approximately 225° F. The tapes 24 next pass through a set of chilled rollers 32 which may have a temperature of approximately 0° F. The chilled rollers 32 solidify the softened resin, causing it to harden or become tacky. The combination of rollers 30 and 32 cause the resin first to melt and then to solidify to such an extent that the series of tapes 24 are "tacked" together, temporarily pre-positioning them before entrance into the mold. The time and temperature which the rollers 30 come in contact with the tapes 24 is controlled so that the resin is merely softened, and almost no polymerization takes place. Depending upon the actual resin employed and the number of laminations used, it is conceivable that it may be necessary to provide several sets of rollers to perform this tacking operation.

The tapes 24 are thus prepared to enter the mold. A molding machine 34 is provided and comprises a pair of mated die members 36, 38 having a mold cavity formed in the shape of the finished article, which in the present description is an aerodynamic compressor blade 10. The machine 34 has a frame member 36. An hydraulic cylinder 44 is provided and is pressurizable to force the platen 42 and die element 36 downward toward die element 38 and to close the die cavity with considerable pressure. Die elements 36 and 38 are intended to be heated by means not shown, such as electrical resistance elements or steam. The heat and pressure used is determined by the article to be molded and the resin employed, and of necessity must be sufficient to cure or polymerize the resin to form a solid mass. In the case of phenolic resins, this temperature is approximately 350° F.

Machine 34 also includes clamps 46 and 48 which are adapted relative to the operation of the machine 34 and the closing of the dies 36, 38 to hold the preconditioned multiple tapes between the die members 36, 38 and also to exert a force for pretensioning of the fibers during the molding operation. The aforementioned pretensioning greatly improves the strength characteristics of the finished article. Such pretensioning and molding of aerodynamic compressor blades is more fully described in U.S. patent application, Serial No. 593,117, Elmer P. Warnken, entitled "Machine for Prestressing and Molding Reinforced Plastic Members," now Patent No. 3,000,429.

In operation the tapes 24 are pulled through the comb 26 and between rollers 30 and 32 to pre-position and precondition them for entrance into the mold. By depressurizing cylinder 44 the die members 36, 38 are separated and the ends of tapes 24 are pulled through the molding machine 34 and the tapes 24 are secured between clamps 46 and 48. Cylinder 44 is then pressurized and die members 36, 38 closed. The heat and pressure thus exerted on the tapes 24 are held until the resin flows in a liquid state to saturate the reinforcing material and cures into a rigid structure the shape of the die cavity. The dies 36, 38 are then separated and the finished article is removed and more tape is pulled through in preparation for the next molding.

Figure 3:
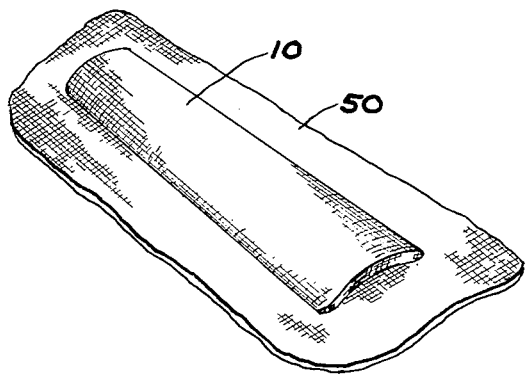
FIGURE 3 is a perspective view of an example of a molded article of reinforced plastic after leaving the machine.

Upon leaving the mold, the thus-formed article has an appearance such as shown in FIGURE 3 wherein the blade 10 is formed with flash material 50 about its periphery. The flash material 50 is removed by appropriate means such as grinding, and the finished blade 10 is ready for its end use.

Means may be provided for withdrawing the heated rollers 30 from the pre-impregnated tapes 24 in the event that it is necessary to hold tapes 24 for an extended period during a curing operation in the mold 34. Undue application of heat might cause the resin to flow to an undesirable extent. Such withdrawal means include hydraulic cylinders 52 and 54 which carry the rollers 30 and can be activated by fluid pressure to force the rollers 30 together or retract them away from the tapes 24.

Figure 6:
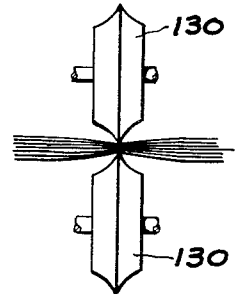
FIGURE 6 is an alternate form of the heated rollers shown in FIGURE 1.

An alternate form of rollers 30 is shown in FIGURE 6, in which rollers 130 are provided to have a relatively sharp meeting line. The rollers 30 have an exterior surface formed by frustrums of a cone affixed base-to-base, thus providing sharp peripheral edges. Rollers 130 function in the same general manner as rollers 30 but press the laminated tapes 24 along a single line which is sufficient to tack them in position relative to one another. Rollers 130 have the advantage that their shape permits controlled application of heat during the conditioning operation.

Figure 5:
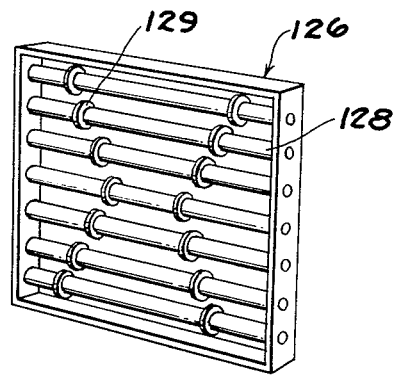
FIGURE 5 is a perspective view of an alternate form of the comb shown in FIGURE 2.

An alternate form of the comb 26 is shown in FIGURE 5. In that view comb 126 contains a plurality of rollers 128 which have upstanding flange members 129 formed thereon to maintain the lateral position of the tapes. Where heavier or large reinforcing material layers are to be used, comb 126 will offer less resistance to movement of the material.

The foregoing constitutes the preferred form of the present invention. Other modifications and embodiments coming within the scope of the following claims may occur to those skilled in the art. For example, several heated rollers may be provided in series to assure better tack and also to precondition the impregnated tapes by driving off volatile material in the resin system.

I claim:

1. Apparatus for manufacturing molded plastic articles having multiple layers of reinforcing material formed therein, said apparatus comprising means for receiving and orienting a plurality of super-imposed continuous tapes of said reinforcing material corresponding to said layers and which tapes are impregnated with a thermosetting resin, said means including a comb member including a plurality of spaced slots, each slot being adapted to properly align each tape with adjacent tapes, means for merging and tacking together said oriented tapes, said latter means comprising a first set of oppositely disposed rollers adapted to press said tapes together with sufficient heat and pressure to soften the impregnated resin, a second set of oppositely disposed rollers, said second set of rollers being adapted to chill said tapes to slow the setting rate of said resin, and mold means for receiving said tacked together tapes for molding the same into said articles and curing the same by the application of sufficient heat and pressure to cause rapid polymerization of said resin.

2. An apparatus for manufacturing molded plastic articles as set forth in claim 1 in which said first set of rollers includes means for withdrawing said rollers away from each other to prevent said tapes from being heated to an extent causing rapid polymerization of the resin prior to entry of the tapes in said mold.

3. An apparatus for manufacturing molded plastic articles as set forth in claim 1 in which said first set of rollers comprises a pair of roller members respectively disposed on opposite sides of said pressed together tapes, each of said roller members being rotatable on an axis disposed generally transversely of the line of movement of said tapes as they progress from said first through said second set of rollers, each roll presenting at the circumferential periphery thereof a radially extending, narrow annular edge disposed oppositely to the corresponding edge of the other roller and parallel to the direction of movement of said tapes.

References Cited in the file of this patent

UNITED STATES PATENTS

| | | |
|---|---|---|
| 1,802,814 | Henderson | Apr. 28, 1931 |
| 2,246,776 | Appleman | June 24, 1941 |
| 2,433,965 | Upson | Jan. 6, 1948 |
| 2,746,514 | Warnken | May 22, 1956 |
| 2,814,328 | Jess | Nov. 26, 1957 |